(12) United States Patent
Xiang et al.

(10) Patent No.: US 9,091,469 B2
(45) Date of Patent: Jul. 28, 2015

(54) APPARATUS AND METHOD FOR VAPOR DRIVEN ABSORPTION HEAT PUMPS AND ABSORPTION HEAT TRANSFORMER WITH APPLICATIONS

(71) Applicant: BLUELAGOON TECHNOLOGIES LTD.

(72) Inventors: Xiao Dong Xiang, Danville, CA (US); Rong Zhang, Cupertino, CA (US)

(73) Assignee: Tahoe Technologies, Ltd., Grand Cayman (KY)

( * ) Notice: Subject to any disclaimer, the term of this patent is extended or adjusted under 35 U.S.C. 154(b) by 221 days.

(21) Appl. No.: 13/789,566

(22) Filed: Mar. 7, 2013

(65) Prior Publication Data

US 2014/0013783 A1 Jan. 16, 2014

Related U.S. Application Data

(60) Provisional application No. 61/609,106, filed on Mar. 9, 2012.

(51) Int. Cl.
*F25B 30/04* (2006.01)
*F25B 15/02* (2006.01)
(Continued)

(52) U.S. Cl.
CPC ............... *F25B 30/04* (2013.01); *B01D 1/0041* (2013.01); *B01D 1/26* (2013.01); *C02F 1/048* (2013.01);
(Continued)

(58) Field of Classification Search
CPC .......... F25B 30/04; F25B 15/02; F25B 15/06; B01D 1/0041; B01D 1/26; C02F 1/048; C02F 1/08; C02F 2303/10; C02F 2103/08
USPC ........ 62/115, 102, 235.1, 476, 489, 492, 495, 62/525, 122, 324.2; 165/115, 160, 172
See application file for complete search history.

(56) References Cited

U.S. PATENT DOCUMENTS 3,404,536 A * 10/1968 Aronson ..................... 62/535
3,501,924 A * 3/1970 Ashley ........................ 62/123
(Continued)

FOREIGN PATENT DOCUMENTS

JP 59-026182 A 2/1984
JP 09-257280 A 9/1997
(Continued)

OTHER PUBLICATIONS

PCT International Search Report and Written Opinion dated Jun. 14, 2013 issued in PCT/US2013/029702 [WO 2013/134553].
(Continued)

*Primary Examiner* — Mohammad M Ali
(74) *Attorney, Agent, or Firm* — Tom Hunter; Weaver Austin Villeneuve & Sampson LLP (57) ABSTRACT

In certain embodiments an all vapor driven absorption heat pump is provided comprising a first heat pump generator comprising a falling film heat exchanger and configured to receive a high temperature vapor and a dilute working medium and to evaporate heat transport material from the dilute working medium; optionally, a second heat pump generator comprising a second falling film heat exchanger configured to receive concentrated working medium and output vapor produced in the first heat pump and to further evaporate the working medium and provide a mid-temperature vapor output and a concentrated working medium; and a heat pump absorber configured to receive a low temperature vapor and the concentrated working medium from the first heat pump generator when the second heat pump generator is absent and to receive said concentrated working medium from the second heat pump generator when the second heat pump generator is present.

28 Claims, 6 Drawing Sheets

(51) Int. Cl.
  *F25B 15/06* (2006.01)
  *B01D 1/00* (2006.01)
  *B01D 1/26* (2006.01)
  *C02F 1/04* (2006.01)
  *C02F 1/08* (2006.01)
  *C02F 103/08* (2006.01)

(52) U.S. Cl.
  CPC . *C02F 1/08* (2013.01); *F25B 15/02* (2013.01); *F25B 15/06* (2013.01); *C02F 2103/08* (2013.01); *C02F 2303/10* (2013.01); *Y02B 30/52* (2013.01)

(56) References Cited

U.S. PATENT DOCUMENTS

| | | | | |
|---|---|---|---|---|
| 4,028,078 A | * | 6/1977 | Peckham | 62/101 |
| 4,171,619 A | * | 10/1979 | Clark | 62/235.1 |
| 4,209,364 A | * | 6/1980 | Rothschild | 203/11 |
| 4,381,220 A | * | 4/1983 | Standiford | 202/154 |
| 4,471,630 A | * | 9/1984 | Sugimoto et al. | 62/175 |
| 4,484,456 A | * | 11/1984 | Reimann | 62/476 |
| 4,981,555 A | * | 1/1991 | Hohmann et al. | 159/13.2 |
| 5,038,574 A | * | 8/1991 | Osborne | 62/101 |
| 5,816,070 A | * | 10/1998 | Meckler | 62/476 |
| 6,536,229 B1 | * | 3/2003 | Takabatake et al. | 62/476 |
| 6,868,695 B1 | * | 3/2005 | Dingel et al. | 62/515 |
| 2007/0072027 A1 | * | 3/2007 | Sridhar et al. | 429/26 |
| 2009/0095001 A1 | * | 4/2009 | Imai et al. | 62/196.3 |
| 2010/0282436 A1 | | 11/2010 | Su et al. | |
| 2011/0233044 A1 | * | 9/2011 | Weinberg et al. | 203/10 |

FOREIGN PATENT DOCUMENTS

| | | |
|---|---|---|
| JP | 2004-176969 A | 6/2004 |
| JP | 2010-164248 A | 7/2010 |
| WO | WO 2013/134553 A1 | 9/2013 |

OTHER PUBLICATIONS

PCT International Preliminary Report on Patentability and Written Opinion dated Sep. 18, 2014 issued in PCT/US2013/029702 [WO 2013/134553].

Australian Patent Examination Report No. 1 dated Jan. 23, 2015 issued in Australian Patent Application No. 2013203429.

* cited by examiner

APPARATUS AND METHOD FOR VAPOR DRIVEN ABSORPTION HEAT PUMPS AND ABSORPTION HEAT TRANSFORMER WITH APPLICATIONS

CROSS-REFERENCE TO RELATED APPLICATIONS

This application claims priority to and benefit of U.S. Ser. No. 61/609,106, filed on Mar. 9, 2012, which is incorporated herein by reference in its entirety for all purposes.

FIELD OF THE INVENTION

The present invention relates to the absorption heat pumps, desalination process and vapor recompression. In particular, in certain embodiments, novel high efficiency vapor driven absorption heat pumps and vapor driven absorption heat transformer with their applications are provided.

BACKGROUND

In heat engine applications, a large amount of low temperature heat is produced and has to be dissipated into the environment, typically through wet-cooling or dry-cooling methods. Since heat engines typically use high temperature high pressure vapor (e.g., water vapor/steam) expansion to generate power, this waste heat is typically provided as a low temperature vapor with latent heat. In wet-cooling processes, fresh cooling water (e.g., from a water tower) is utilized in a condenser to remove the low temperature latent heat by dissipating large amounts of latent heat in the cooling water thereby increasing the cooling water temperature, and eventually dissipating the heat into the environmental air. In dry-cooling processes, large wind blowers are typically used with much larger heat exchanger(s) because air does not as efficiently dissipate the latent heat as water. This latent heat that is dissipated often accounts for more than 50% of the total energy consumed in thermal power generation stations worldwide, including fossil fuel based fire power plants, concentration solar power plants (CSPs), and nuclear power plants.

Some important direct thermal energy applications, such as absorption heat pumps and low temperature multi-effect evaporation desalination processes, utilize mid and low temperature water vapor. Normally a large amount of thermal energy has to be consumed to obtain the mid and low temperature vapor because vaporization processes require large amounts of latent heat during the phase change process. If absorption heat pumps and absorption heat transformers can be made so that mid to low temperature residue latent heat energy can be further utilized instead of condensed into water directly via wet-cooling or dry-cooling methods, a significant amount of thermal energy can be saved and a great amount of carbon dioxide emissions can be reduced.

However, in typical conventional absorption heat pumps (so called first type heat pumps), a high temperature heat source is needed to generate high enough temperature vapor to convert the mid to low temperature latent heat from the mid to low temperature vapor into higher temperature water for space heating (or other) purposes. Although these systems can utilize the mid to low temperature latent heat of the vapor, the sensible heat produced in the higher temperature water is less valuable as compared to a similar temperature vapor. This is because vapor forms of thermal energy are readily used in low temperature multi-effect evaporation processes, e.g., for water purification and/or desalination processes. Therefore, a method of producing higher temperature thermal energy in vapor form with type one heat pumps is of interest.

On the other hand, mechanical vapor recompression (MVR) is an effective method that utilizes a mechanical compressor to compress and heat "waste" vapor to a higher temperature for reuse. For example, MVR is used in drying processes where concentrated inorganic solutions from, e.g., the end stage of sewage processing are dried to powder so that no pollutants are released into the environment. The conventional drying process consumes a great amount of thermal energy because the water has to be heated to boiling point to be vaporized and this phase change process requires a lot of latent heat. Using MVR vapor from the drying process can be recompressed to a higher temperature so that this higher temperature vapor can be reused to vaporize water from the solution with a heat exchanger. In this process, a certain amount of electricity is consumed to drive the mechanical compressor. In other words, electrical energy is converted into sensible heat of the vapor and thereby increases the vapor temperature. If a vapor driven absorption heat pump and absorption heat transformer (also called second type heat pump) could be used adequately, it would be possible to consume the thermal energy to recompress the used vapor. This approach would save high quality energy, such as electricity, and provide an economic benefit because electrical energy is more expensive than the thermal energy.

Furthermore, in a conventional generator for a LiBr solution based heat pump, the heat exchanger utilizes "pool boiling" to generate vapor from a diluted LiBr solution in order to concentrate the LiBr solution for absorption usage. This is because in most cases, the heat exchanger in the generator has a regular tube/shell configuration with the tubes that connects with the heat source immersed into the LiBr solution. The temperature difference between the heat source and the diluted LiBr solution should be more than 20 degrees in order to sufficiently generate water vapor. Using a conventional thermal energy source, such as a nature gas fire boiler, this temperature and pressure requirements pose no constrains for the heat source what so ever. This is because for a fossil fuel heat source, a mere 20 to 30-degree temperature difference in vapor generation process will not consume much more fossil fuel, and the boiler works at much higher temperature anyway.

However, if the heat comes from different sources, such as solar thermal collectors or waste heat from other heat engines or appliances, this 20 degree or higher temperature difference is hard to obtain. If lower temperature steam vapor can be utilized, the requirement for the heat source temperature can be lowered to drive the heat pump or absorption chiller.

SUMMARY OF THE INVENTION

In various embodiments general methods and apparatus to solve these problems are provided herein. In particular, methods and apparatus are provided herein to solve above mentioned problems by lowering the minimum temperature threshold for latent heat reuse and/or by lifting the low temperature latent heat to a higher temperature latent heat in vapor form via specially designed absorption heat pumps and absorption heat transformers. The benefits of these methods can be applied in water purification and desalination systems with low-temperature multi-effect evaporation processes, and to replace mechanical vapor recompression while significantly reducing the energy consumed and the associated costs.

In certain embodiments the configurations described herein permit recycling of the low temperature vapor back into the system without condensation, permitting a significant amount of latent heat to be reused thereby greatly reduced the consumption of the thermal energy required to generate the vapor.

In various embodiments an all vapor driven absorption heat pump is provided comprising a first heat pump generator configured to receive a high temperature vapor from a high temperature heat source, wherein said first generator comprises a falling film heat exchanger and said first generator is configured to receive a dilute working medium from a heat pump absorber and utilize said heat from said high temperature vapor to evaporate heat transport material from said dilute working medium delivered through said falling film heat exchanger and thereby provide a mid-temperature vapor output and a concentrated working medium; optionally, a second heat pump generator comprising a second falling film heat exchanger, where said wherein second heat pump generator is configured to receive said concentrated working medium produced in said first heat pump generator and said output vapor produced in said first heat pump generator and to utilize heat from output vapor produced in said first heat pump to further evaporate concentrated working medium produced in said first heat pump generator and delivered through said second falling film heat exchanger and thereby provide a mid-temperature vapor output and a more concentrated working medium; and a heat pump absorber comprising a third falling film heat exchanger, where said absorber is configured to receive a heat transport material in a low temperature vapor form from a low temperature source and is configured to receive said concentrated working medium from said first heat pump generator when said second heat pump generator is absent and to receive said concentrated working medium from said second heat pump generator when said second heat pump generator is present, and is configured to utilize heat produced by absorption of said low temperature vapor in said concentrated working medium to produce a mid-temperature vapor output inside absorber heat exchange tubes from input water source and said dilute working medium, and wherein said heat pump absorber is configured to deliver said dilute working medium to said first heat pump generator. In certain embodiments the second heat pump generator is absent and the transformer comprises a single effect heat pump. In certain embodiments the heat pump comprises a heat exchanger that exchanges heat between a line that delivers the concentrated working medium from the first heat pump generator to the heat pump absorber and a line that delivers the dilute working medium from the heat pump absorber to the first heat pump generator. In certain embodiments the second heat pump generator is present and the heat pump comprises a dual effect heat pump. In certain embodiments the first heat pump generator is a high pressure generator and the second heat pump generator is a lower pressure heat pump generator. In certain embodiments the heat pump comprises a heat exchanger that exchanges heat between a line that delivers the concentrated working medium from the second heat pump generator to the heat pump absorber and a line that delivers the dilute working medium from the heat pump absorber to the first heat pump generator. In certain embodiments the heat pump comprises a heat exchanger that exchanges heat between a line that delivers the concentrated working medium from the first heat pump generator to the second heat pump generator and a line that delivers the dilute working medium from the heat pump absorber to the first heat pump generator. In certain embodiments the heat pump comprises a heat exchanger that exchanges heat between a line that delivers a heat transport fluid out of the first heat pump generator. In various embodiments the vapor in the heat pump comprises water vapor. In certain embodiments the low temperature vapor is at a temperature that ranges from about 40° C. to about 70° C. In certain embodiments the mid-temperature vapor is at a temperature that ranges from about 60° C. to about 130° C. In certain embodiments the high temperature vapor is at a temperature that ranges from about 130° C. to about 165° C. In certain embodiments the heat exchanger in the absorber receives a fluid and absorbs vapor thereby converting latent heat of the absorbed vapor into chemical absorption heat to generate vapor inside the heat exchanger (e.g., inside the heat exchanger tubes) while producing a dilute working medium. In certain embodiments the heat transport fluid is water. In certain embodiments the working medium comprises lithium bromide. In certain embodiments the working medium comprises lithium bromide and an organic salt of sodium and/or potassium (e.g., an acetate, a formate, a lactate, etc.). In certain embodiments the working medium comprises ammonia. In certain embodiments the high temperature heat source is selected from the group consisting of a solar concentrator, a steam turbine, a nuclear power plant, a coal power plant, and a waste incineration facility. In certain embodiments the heat pump is operably coupled to an evaporation desalination or water purification apparatus so that the mid-temperature vapor output of the heat pump enters the desalination apparatus and low temperature vapor output from the desalination or water purification apparatus enters the heat pump. In certain embodiments the desalination apparatus is a multiple-effect evaporation device or water purification apparatus. In certain embodiments the low temperature vapor from the desalination or water purification apparatus enters either conventional condenser or a low temperature phase changing thermal storage device to condense into water. In certain embodiments the water is returned to the absorber. In certain embodiments the heat pump is operably coupled to a drying system to produce a thermal recompression system. In certain embodiments the system is configured to introduce mid-temperature vapor from the drying system into both the first generator and the absorber and to deliver high temperature vapor produced in the absorber back into the drying system. In certain embodiments the drying system is a sewage drying system.

In certain embodiments a method of combining a high temperature vapor and a low temperature vapor to produce a mid-temperature vapor is provided where the method comprises providing a heat pump as described above, and/or below in the written description, and/or in the claims; introducing the high temperature vapor into the first heat pump generator in the heat pump; introducing the low temperature vapor into an absorber comprising the heat pump; and receiving a mid-temperature vapor produced by the heat pump. In certain embodiments the high temperature heat source is selected from the group consisting of a solar concentrator, a steam turbine, a nuclear power plant, a coal power plant, and a waste incineration facility. In certain embodiments the heat pump is operably coupled to an evaporation desalination or water purification apparatus so that the mid-temperature vapor output of the heat pump enters the desalination or water purification apparatus and low temperature vapor output from the desalination apparatus enters the heat pump. In certain embodiments the desalination or water purification apparatus is a multiple-effect evaporation apparatus. In certain embodiments the low temperature vapor from the desalination or water purification apparatus enters either conventional condenser or a low temperature phase changing thermal storage device to condense into water. In certain embodiments the water is returned to the absorber. In certain embodiments the heat pump is operably coupled to a drying system to produce a thermal recompression system. In certain embodiments the system introduces mid-temperature vapor from the drying system into both the first generator and the absorber and delivers high temperature vapor produced in the absorber back into the drying system. In certain embodiments the drying system is a sewage drying system.

DETAILED DESCRIPTION

Absorption heat pump devices are described herein that permit a number of heat sources including, but not limited to solar thermal collectors, solar concentrators, coal power plants, exhaust from a natural gas turbine from combined heat and power units, waste incineration plants, chemical decomposition systems, nuclear power plants, and the like to be used as a heat source to drive an absorption heat pump cycle.

Aspects of the innovations, such as those set forth in various implementations described below, relate to systems and methods of integrating one or more heat pump(s) with a multi-effect evaporation device. However, it should be understood that the inventions provided herein are not limited to any such specific illustrations, but are defined by the scope of the claims and full disclosure.

Aspects of the innovations, such as those set forth in some of the implementations below, may relate to systems and methods of integrating single-effect absorption heat pump(s) with a single-effect absorption heat transformer to form a thermal vapor recompression device. However, it should be understood that the inventions provided herein are not limited to any such specific illustrations, but are defined by the scope of the claims and full disclosure.

It will also be appreciated that where lithium bromide absorption systems are described herein, the methods and devices described herein need not be limited to LiBr absorption systems. Other absorption systems (e.g., ammonia/water/hydrogen) are contemplated.

In various embodiments an absorption heat pump (e.g., a LiBr absorption heat pump) is provided to lift lower temperature vapor to become vapor at a medium temperature so that this temperature lifted vapor can be used in low temperature multi-effect desalination systems or in other processes. Such absorption heat pumps can be made using a novel single or double effect LiBr (or other) absorption process, e.g., as described herein. Accordingly, in certain embodiments, integrated heat pumps combined with low temperature multiple-effect evaporation desalination devices and methods of use thereof are provided. In this way, a significant amount of low temperature latent heat may be utilized so that the overall thermal energy utilization efficiency is improved.

In various embodiments a novel single effect absorption heat transformer (e.g., a second type LiBr absorption heat pump) is provided to convert mid-temperature vapor into two parts—one part is temperature lifted vapor and the other part is lower temperature vapor. In certain embodiments, by integrating a single effect absorption heat pump combined with a single effect absorption heat transformer, a thermal vapor recompression system is formed. Accordingly, thermal vapor recompression devices and methods of use thereof are provided.

Figure 1:
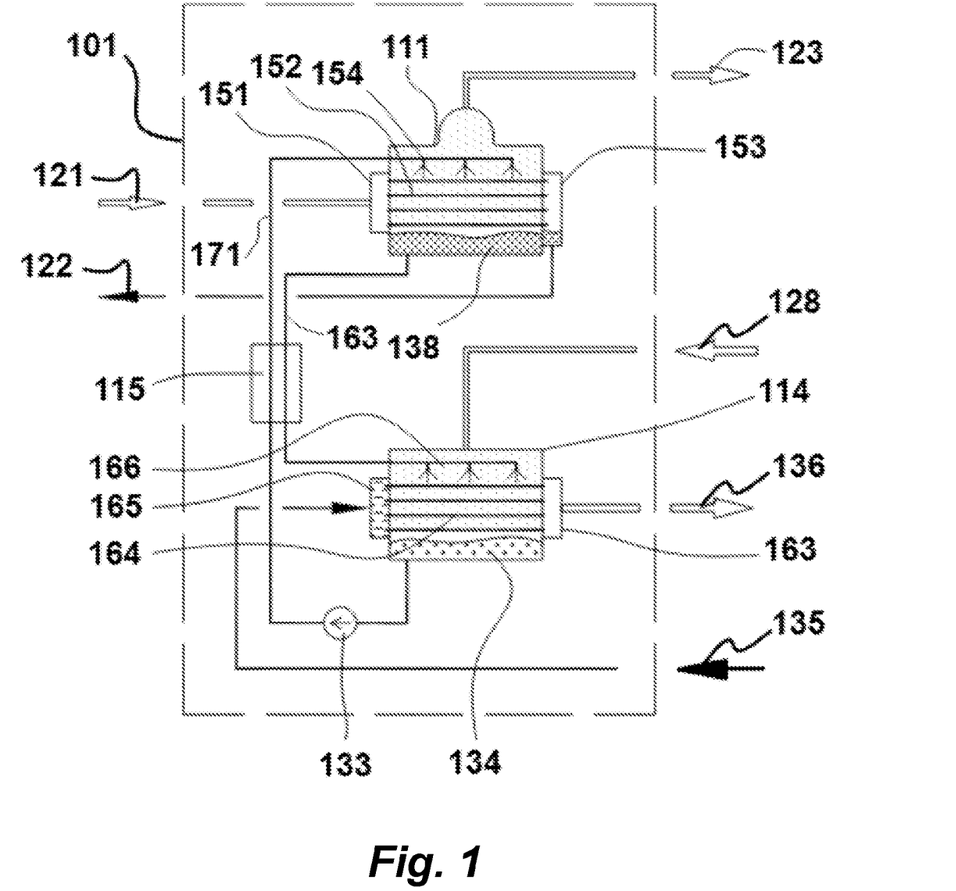
FIG. 1 illustrates a block diagram of an illustrative system comprising an all vapor driven single-effect absorption heat pump (e.g., first type water/LiBr absorption heat pump), including a generator and an absorber, consistent with certain aspects related to the innovations described herein.

As illustrated in FIG. 1, in certain embodiments, a novel single effect absorption heat pump described herein comprises a generator (e.g., LiBr generator) and an absorber (e.g., a LiBr absorber) and the input and output thermal media are provided in a vapor form (e.g., water vapor). Lower temperature, lower pressure "compromised vapor", e.g., from exhaust of heat appliances, such as later stage(s) of a multi-effect evaporation desalination device, enters the absorption chamber under vacuum condition(s) (e.g., a partial vacuum) and is absorbed by the concentrated working solution (e.g., LiBr/water solution) showering/dripping down on heat exchange tubing surfaces in the absorber chamber. The thermal energy released upon absorption heats up the water inside absorber tubing to produce vapor directly. In certain embodiments, a steam/water separator is used to separate the vapor and the water from the heat exchange tubing. Because of the high circulation rate in the tubing, eventually, a large amount of water vapor is produced at mid-temperature that can then be used to drive a multi-effect evaporation desalination system, or other processes. The diluted working solution (e.g., lithium-bromine-water solution) after absorption in the absorber chamber is pumped into the generator to shower/drip down onto the heat exchange tubing surfaces. A higher temperature vapor, such as a solar thermal collector driven steam source or natural gas turbine exhaust driven steam source, or from later stage steam turbine as the input energy source for the heat pump, enters the heat exchange tubing to evaporate the diluted solution by, e.g., a falling film heat exchange process.

Figure 2:
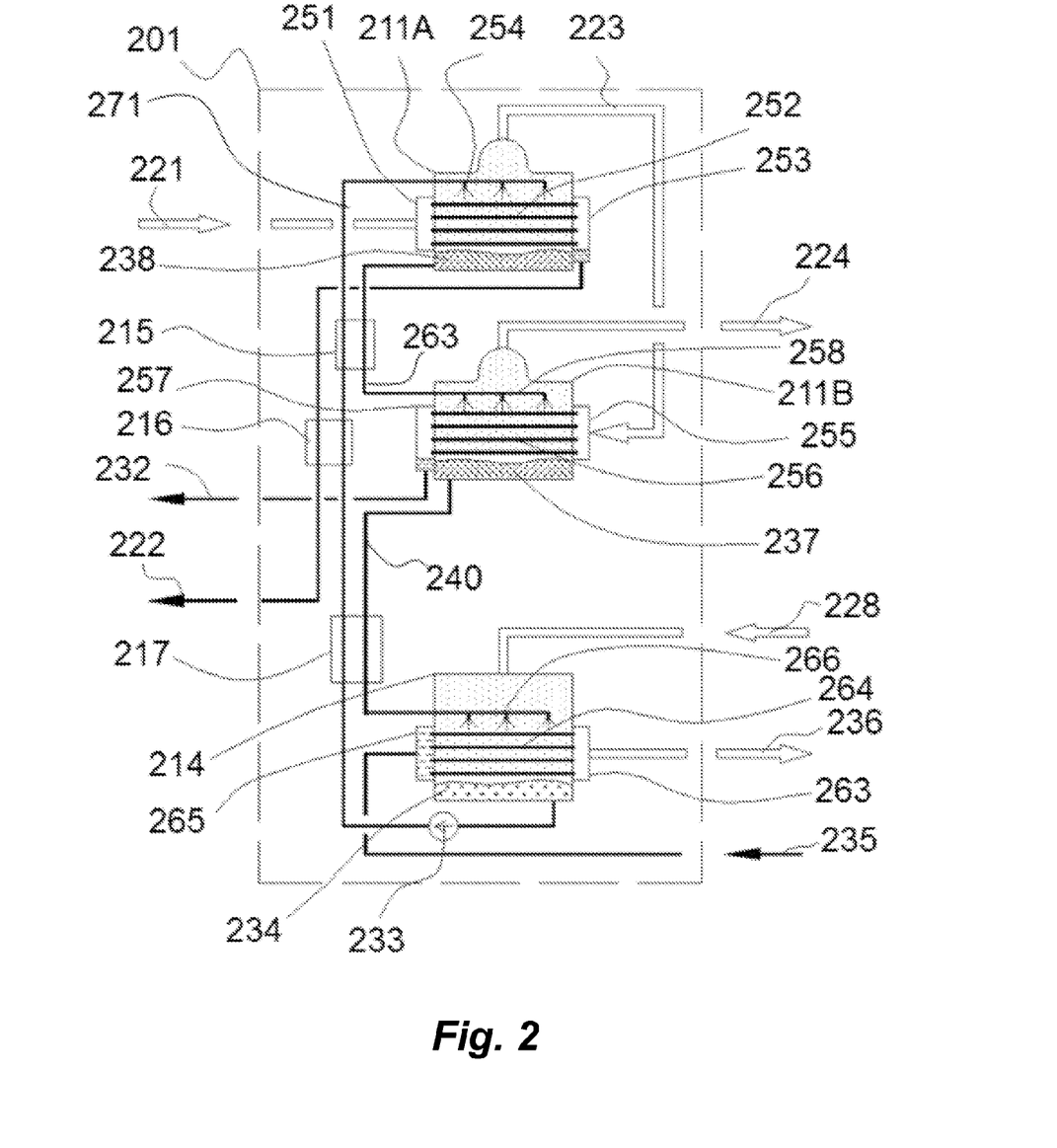
FIG. 2 illustrates a block diagram of an illustrative system comprising an all vapor driven double-effect absorption heat pump (e.g., first type water/LiBr absorption heat pump), including two generators and an absorber, consistent with certain aspects related to the innovations described herein.

As illustrated in FIG. 2, in certain embodiments, a novel double-effect heat pump described herein comprises two generators (e.g., LiBr generators). One generator is a high pressure generator and the other generator is a low pressure generator. The device also incorporates an absorber (e.g., an LiBr absorber) while the input and output thermal media are provided as a vapor (e.g., water vapor). Lower temperature, lower pressure "compromised (e.g., waste) vapor" from exhaust of heat appliances, such as later stage of a multi-effect evaporation desalination or water purification devices or the vapor from a steam turbine exhaust, enters the absorption chamber under vacuum conditions and is absorbed by the concentrated working solution (e.g., LiBr/water solution) showering/dripping down on heat exchange tubing surfaces in the absorber chamber. The thermal energy released upon absorption heats up the water inside absorber tubing to produce vapors directly. In certain embodiment, a steam/water separator is used to separate the vapor and the water from the heat exchange tubing. Because of the high circulation rate in the tubing, eventually, a large amount of water vapor is produced at mid-temperature that can then be used to drive the multi-effect evaporation desalination and/or water purification processes, or other processes. The diluted working solution (e.g., lithium-bromine-water solution) after absorption in the absorber chamber is pumped into the double effect generators to shower/drip down onto the heat exchange tubing surfaces. A higher temperature vapor, such as a solar thermal collector driven steam source or natural gas turbine exhaust driven steam source or later stage of a steam turbine, as the input energy source for the heat pump enters the heat exchange tubing to evaporate the diluted solution by falling film heat exchange process.

Figure 3:
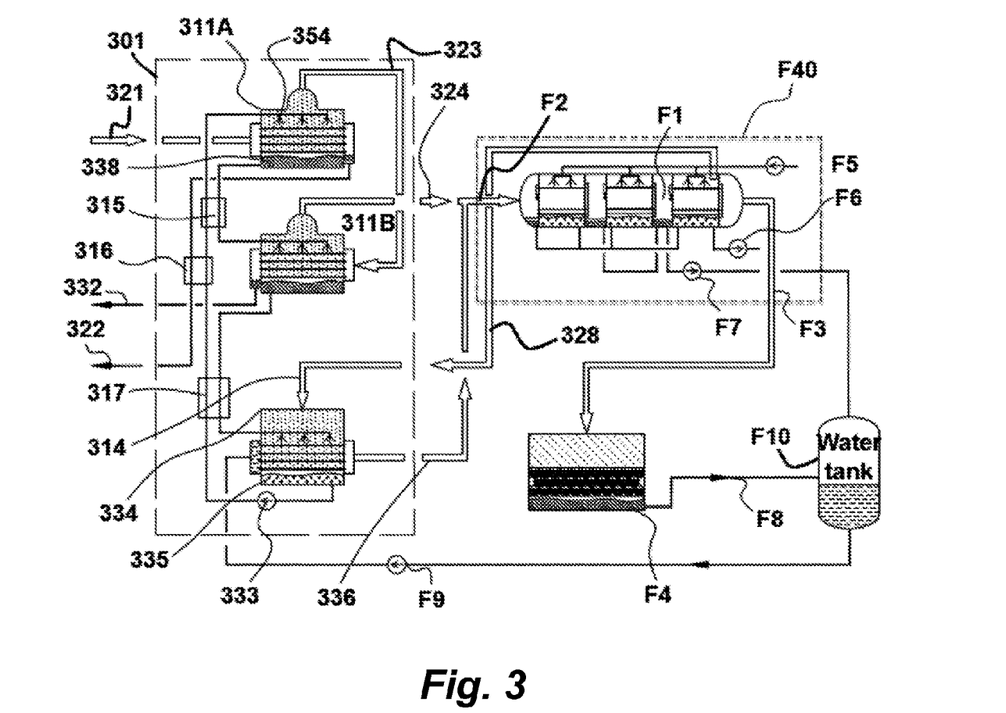
FIG. 3 illustrates a block diagram of an illustrative system comprising an above mentioned double-effect absorption heat pump combining with a multi-effect evaporation device, consistent with certain aspects related to the innovations described herein.

FIG. 3 illustrates certain possible applications. As shown in this Figure, a double effect heat pump is combined with a low-temperature multi-effect desalination or water purification apparatus. The high temperature vapor can be obtained from the middle or lower stage of a steam turbine power generator where the steam has already used up most of its kinetic energy to produce electricity so that the steam used in the heat pump will not affect the power generation efficiency that much. This type of steam is relatively less expensive to consume. Each ton of higher temperature vapor at the input, plus 1.3 ton of lower temperature vapor that comes from the exhaust of a multi-effect desalination device, produces close to 2.1 tons of medium temperature vapor that can be utilized in the multi-effect evaporation desalination and/or water purification process, resulting in an increase of fresh water produced due to an approximate doubling in the amount of available mid-temperature vapor. More than one half of the resulting low temperature vapor can be recycled back into the same heat pump cycle as described above. The remaining less than a half of the resulting low temperature vapor can either be wet-cooled or dry-cooled to condense into water, or to be put into a low temperature phase change thermal energy storage unit (e.g., as described in PCT Application No: PCT/US2010/049406; and U.S. patent application Ser. Nos. 12/885,411 and 12/916,539, which are incorporated herein by reference for the thermal storage devices, materials, and methods described therein), to be condensed into water while releasing its latent heat to the thermal storage materials. The condensed water can then return to complete the thermal dynamic circle. The low temperature latent heat stored in the phase change material (PCM) can dissipate later into the environment when the ambient air temperature gets lower during night. This stored low temperature latent heat may also be used for space heating or other purposes.

Figure 4A:
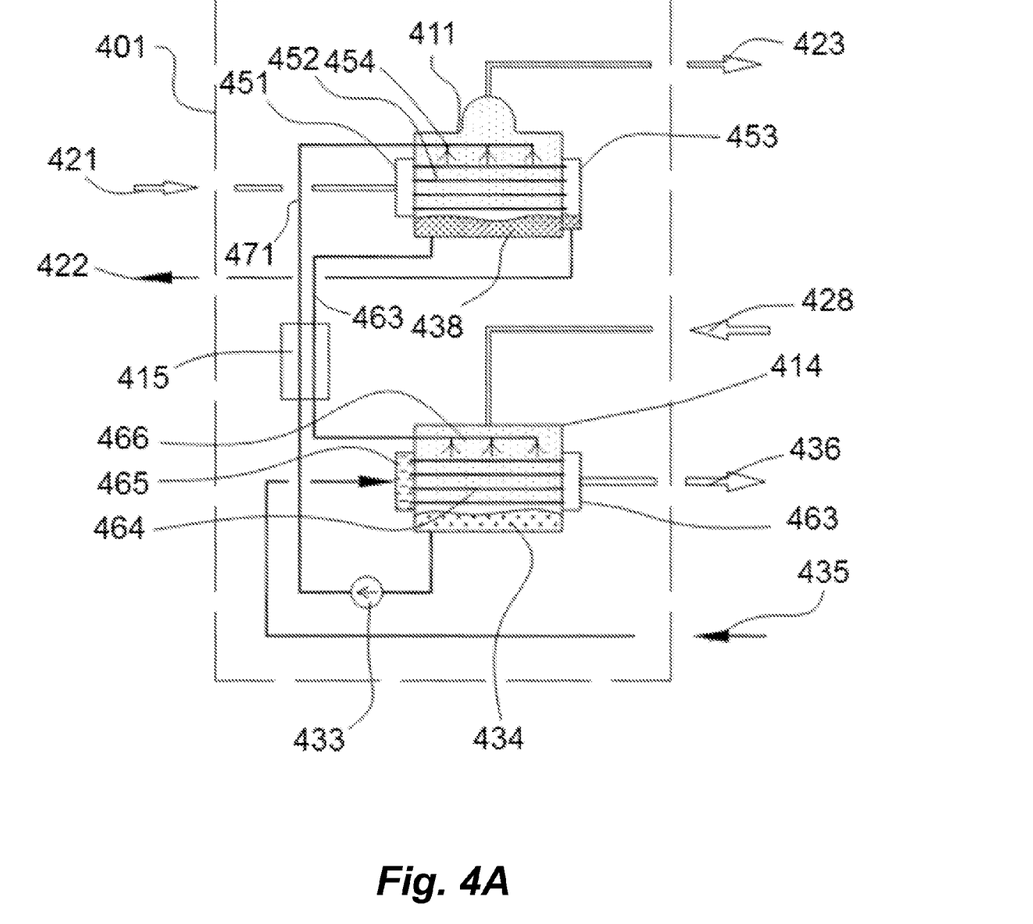
FIG. 4A shows a schematic diagram of an illustrative system comprising an all vapor driven single-effect absorption heat transformer (e.g., second type water/LiBr heat pump), including a generator and an absorber, consistent with certain aspects related to the innovations described herein.

As illustrated in FIG. 4A, in certain embodiments, a novel single effect absorption heat transformer described herein comprises a generator (e.g., an LiBr generator) and an absorber (e.g., an LiBr absorber) while the input and output thermal media are vapor phase (e.g., water vapor). The mid-temperature mid pressure "used vapor", e.g., from a boiling evaporation system in a drying device can be split into two parts. One enters the generator from the tubing side to regenerate the concentrated working solution (e.g., LiBr/water solution) by showering/dripping down the diluted working solution from the absorber on the heat exchange tubing surfaces in the generator chamber; the vapor produced in the generator chamber has lower temperature and pressure than the input vapor. This vapor can be used in a low temperature multi-effect evaporation process, as described in more detail later.

The other one enters absorption chamber under vacuum condition and is absorbed by the concentrated working solution (e.g., LiBr/water solution) showering/dripping down on the heat exchange tubing surfaces in the absorber chamber; the thermal energy released upon absorption heats up the water inside absorber tubing to produce vapors directly. In certain embodiments, a steam/water separator is used to separate the vapor and the water from the heat exchange tubing. Because of the high circulation rate in the tubing, eventually, a large amount of water vapor is produced at higher temperature than the input vapor, which can then be used to reenter the said boiling evaporation system to generate more mid-temperature vapor, as will be described later. The diluted working solution (e.g., lithium-bromine-water solution) after absorption in the absorber chamber is pumped into the generator to shower/drip down onto the heat exchange tubing surfaces to close the circulation cycle.

An illustrative implementation of a single-effect absorption heat pump (so called first type heat pump) is shown in FIG. 1. This heat pump 101 uses a vapor form as its thermal energy input and output. The heat pump shown in FIG. 1 comprises a generator 111; a heat pump absorber 114; LiBr solution heat exchangers 115; higher temperature vapor input 121 for the generator; mid-temperature vapor 123 produced in the generator 111; lower temperature vapor 128 from another source (such as exhaust stage from a multi-effect evaporation system or end units from other thermal appliances); diluted working solution (e.g., LiBr) circulation pump 133; diluted working solution (e.g., LiBr) 134 in the absorber 114; cooling water input 135 from another circulation loop for the absorber; mid-temperature vapor output 136 from absorber 114; heat transfer fluid (e.g., water) 122 output from the generator 111; concentrated working solution (e.g., LiBr) 138 produced in the generator 111; 151 and 163 are the heat exchange tube inlets for the generator 111 and the absorber 114; 152 and 164 are the heat exchanger tubes; 153 and 165 are the heat exchange tube outlets; 154 and 166 are the sprayers for showering LiBr solutions (e.g., falling film heat exchangers).

As shown in FIG. 1, generator 111 generates concentrated working solutions (e.g., LiBr) 138 from a diluted working solution (e.g., LiBr) 134 utilizing incoming higher temperature vapor 121. The vapor produced in the generator 111 is the mid-temperature vapor 123. Absorber 114 absorbs water vapor 128 at low temperature while producing mid-temperature vapor 136 by means of chemical absorption heat and pool boiling inside the absorbing tubes. The function of this single-effect heat pump is to use high temperature input vapor 121 to convert the lower temperature vapor 128 to the mid-temperature vapor 124. A low temperature vapor 128 from another source, such as from the exhaust stage of a multi-effect evaporation desalination stage, enters absorber 114. The concentrated working solution (e.g., LiBr) 138 from the generator 111 is sprayed onto the heat exchange tube 164 surfaces via spray head 166, absorbs the vapor 128 while transferring the chemical absorption heat into the water inside tube 164 via a falling film heat exchange process. The thermal energy generated during this absorption process heats up the circulation water 135 inside the tube 164 to become vaporized. This process produces vapor 136 that reaches mid-temperature range. Meanwhile, the diluted working solution (e.g., LiBr) 134 at the bottom of the absorber 114 is pumped to generator 111 via a circulation pump 133 through a heat exchangers 115 to the spray head 154 in the generator 111. The higher temperature vapor 121 passes through the heat exchanger 151, 152 and 153, vaporizing sprayed diluted working solution (e.g., LiBr) 134 on the heat exchange tube 152 surfaces via falling film heat exchange process. The vapor 123 produced in the generator 111 has lower temperature than the input vapor 121 temperature. Both mid-temperature 123 and 136 are used to drive a multi-effect evaporation system that desalinates seawater or purifies savage water after certain. The working solution (e.g., LiBr) 138 has been gone through one concentration process, so called single-effect heat pump. The concentrated solution flows into absorber 114 via the spray head 166 to complete the heat pump cycle.

Referring to FIG. 1 and Table 1, an illustrative, but non-limiting, set of working parameters is provided for the above described single-effect absorption heat pump in a typical application.

TABLE 1

An illustrative example of a single-effect absorption (first type) heat pump

| port | media | temperature (° C.) | flow rate (t/h) |
|------|-------|--------------------|-----------------|
| 121  | vapor | 163                | 1.00            |
| 122  | water | 163                | 1.00            |
| 123  | vapor | 118                | 0.86            |
| 128  | vapor | 100                | 0.86            |
| 136  | vapor | 118                | 0.89            |
| 135  | water | 114                | 0.89            |

An illustrative implementation of a double-effect heat pump is shown in FIG. 2. This heat pump 201 uses a vapor form as its thermal energy input and output. The heat pump shown in FIG. 2 comprises a first generator 211A; a second generator 211B; a heat pump absorber 214; LiBr solution heat exchangers 215, 216, and 217; higher temperature vapor input 221 for the first generator; vapor 223 produced from the first generator; mid-temperature vapor 224 produced in the second generator; lower temperature vapor 228 from another source (such as exhaust stage from a multi-effect evaporation system or end units from other thermal appliances); diluted working solution (e.g., LiBr) circulation pump 233; diluted working solution (e.g., LiBr) 234 in the absorber 214; cooling water input 235 from another circulation loop for the absorber; mid-temperature vapor output 236 from absorber 214; heat transfer fluid (e.g., water) 222 output from the first generator; heat transfer fluid 232 (e.g., water) output from the second generator 211B; concentrated working solution (e.g., LiBr) 237 produced in the second generator; concentrated working solution (e.g., LiBr) 238 produced in the first generator; 251, 255, 263 are the heat exchange tube inlets for the two generators and the absorber; 252, 256, 264 are the heat exchanger tubes; 253, 257, 265 are the heat exchange tube outlets; 254, 258, 266 are sprayers (e.g., falling film heat exchangers).

As shown in FIG. 2, generators 211A and 211B generate concentrated working solutions (e.g., LiBr) 237 and 238 from a diluted working solution (e.g., LiBr) 234 utilizing incoming higher temperature vapor 221. Absorber 214 absorbs water vapor 228 at low temperature while producing midrange temperature vapor 236 by means of chemical absorption heat and pool boiling inside the absorbing tubes. The function of this double-effect heat pump is to use high temperature input vapor 221 to convert lower temperature vapor 228 into two parts of mid-temperature vapor 224 and 236 via the low pressure generator 211B and the absorber 214.

A low temperature vapor 228 from another source, such as from the exhaust stage of a multi-effect evaporation desalination stage, enters absorber 214. The concentrated working solution (e.g., LiBr) 237 from the generator 211B is sprayed onto the heat exchange tube 264 surfaces via spray head 266, absorbs the vapor 228 while transferring the chemical absorption heat into the water inside tube 264 via a falling film heat exchange process. The thermal energy generated during this absorption process heats up the circulation water 235 inside the tube 264 to become vaporized. This process produces vapor 236 that reaches mid-temperature range. Meanwhile, the diluted working solution (e.g., LiBr) 234 at the bottom of the absorber 214 is pumped to generator 211A via a circulation pump 233 through 3 heat exchangers 217, 216, and 215 to the spray head 254 in the first generator 211A. The higher temperature vapor 221 passes through the heat exchanger 251, 252 and 253, vaporizing sprayed diluted working solution (e.g., LiBr) 234 on the heat exchange tube 252 surfaces via falling film heat exchange process. The vapor 223 produced in the generator 211A is transported to generator 211B as its heat source. The partially concentrated working solution (e.g., LiBr) 238 flows into generator 211B via spray head 258 to be concentrated further with similar process as described above. The vapor 224 produced in the second generator 211B reaches mid-temperature range. Both mid-temperature 224 and 236 are used to drive a multi-effect evaporation system that desalinates sea water or purifies wasted water. At the same time, the working solution (e.g., LiBr) 237 at the bottom of generator 211B has been further concentrated. The working solution (e.g., LiBr) 237 has been gone through two concentration processes, so called double-effect heat pump. The concentrated solution flows into absorber 214 via the spray head 266 to complete the heat pump cycle.

Referring to FIG. 2 and Table 2, an illustrative, but non-limiting, set of working parameters is provided for the above described double-effect absorption heat pump in a typical application.

TABLE 2

An illustrative example of a double-effect absorption (first type) heat pump

| port | media | temperature (° C.) | flow rate (t/h) |
|------|-------|--------------------|-----------------|
| 221  | vapor | 163                | 1.00            |
| 232  | water | 114                | 0.67            |
| 222  | water | 110                | 1.00            |
| 223  | vapor | 114                | 0.67            |
| 224  | vapor | 70                 | 0.64            |
| 228  | vapor | 40                 | 1.31            |
| 236  | vapor | 70                 | 1.47            |
| 235  | water | 32                 | 1.47            |

FIG. 3 shows a schematic illustration of a double-effect heat pump described in FIG. 2 combines with a multiple-effect evaporation desalination device or a sewage water purification apparatus. As illustrated therein, a double-effect heat pump (e.g., as described above) 301 is combined with a multiple-effect evaporation desalination apparatus F40 to produce fresh water from sewage water. As illustrated in FIG. 3, higher temperature vapor enters the heat pump 301 via port 321, while parts of the low temperature vapor from the stage F1 of multiple-effect desalination apparatus F40 enters the same heat pump 301 via port 328 to produce mid-temperature vapor from port 324 and 336. The sum of these two mid-temperature vapors enters the desalination apparatus F40 via port F2 to start the multiple-effect evaporation process. The leftover low temperature vapor F3 from the end stage of F40 enters either a conventional condenser or a low temperature phase changing thermal storage device F4 to condense into water. The condensed water is circulated back into 314 via a circulation pump F9 to complete the entire cycle.

In various embodiments the heat pump combined with a multiple-effect evaporation desalination or sewage water purification apparatus, as described above (e.g., as illustrated in FIG. 3), can be described in detail as follows. Typically, a multiple-effect evaporation apparatus takes about a 70° C. to 75° C. vapor as its thermal energy input. Because the temperature difference between each effect of evaporation is between 2.5 to 3 degrees, 10 to 12 effects of evaporation processes can be achieved with the system (e.g., as illustrated in FIG. 3, each effect can be a stage in an evaporator. Therefore, for example, for each ton of input vapor (at 163° C.), 18 tons of fresh water can be produced with such an apparatus. Utilizing heat pumps as described herein, from each ton of 163° C. vapor, combined with 1.3 tons of 40° C. vapor from port F1 to absorber 314, 2.1 tons of 70° C. vapor can be produced, e.g., as illustrated in FIG. 2. In particular, if concentrated LiBr solution entering the absorber 314 is at a temperature of 94° C., enough temperature difference exists to produce 72° C. vapor inside the heat exchange tube 364 utilizing the pool boiling mechanism. In this way, 50% to 80% more fresh water can be produced from the sewage water using the same amount of incoming vapor at 70° C., given that a larger multi-effect evaporation apparatus is used in the combination. The same process can also be used to process seawater or brackish water to produce the fresh water.

Referring to FIG. 3, an illustrative, but non-limiting, set of working parameters is provided for each port on the apparatus is presented in Table 3.

TABLE 3

Illustrative working parameters for one example of a double-effect absorption (first type) heat pump.

| port | medium | temperature (° C.) | flow rate (t/h) |
|------|--------|--------------------|-----------------|
| 321 | vapor | 163 | 1.00 |
| 323 | vapor | 114 | 0.67 |
| 324 | vapor | 70 | 0.64 |
| 328 | vapor | 40 | 1.31 |
| 336 | vapor | 70 | 1.47 |
| 332 | water | 114 | 0.67 |
| 322 | water | 110 | 1.00 |
| F2 | vapor | 70 | 2.11 |
| F3 | vapor | 40 | 0.04 |
| F5 | sewage 0.5% | 35 | 19.5 |
| F6 | Brine 6% | 67 | 1.6 |
| F7 | water | n/a | 18.7 |
| F8 | water | 32 | 0.04 |

An illustrative implementation of a single-effect absorption heat transformer (so called second type heat pump) is shown in FIG. 4. This heat transformer 401 uses a vapor form as its thermal energy input and output. The heat transformer shown in FIG. 4 comprises a generator 411; LiBr solution heat exchangers 415; mid-temperature vapor input 421 for the generator; lower temperature vapor 423 produced from the generator; mid-temperature vapor 428 from the same source as vapor 421 (e.g., such as vapor from a drying vaporizer or a mid stage vapor from steam turbine). The following features are identified I the figure: diluted working solution (e.g., LiBr) circulation pump 433; diluted working solution (e.g., LiBr) 434 in the absorber 414; cooling water input 435 from another circulation loop for the absorber; higher temperature vapor output 436 from absorber 414; heat transfer fluid (e.g., water) 422 output from the generator; concentrated working solution (e.g., LiBr) 438 produced in the generator 411; 451 and 263 are the heat exchange tube inlets for the generators and the absorber; 452 and 264 are the heat exchanger tubes; 453 and 465 are the heat exchange tube outlets; 454 and 266 are the sprayers (e.g., falling film heat exchangers).

As shown in FIG. 4A, generator 411 generates concentrated working solutions (e.g., LiBr) 438 from a diluted working solution (e.g., LiBr) 434 utilizing incoming higher temperature vapor 421. The vapor produced in the generator 411 is the mid-temperature vapor 423. Absorber 414 absorbs water vapor 428 at low temperature while producing mid-temperature vapor 436 by means of chemical absorption heat and pool boiling inside the absorbing tubes. The function of this single-effect heat pump is to use high temperature input vapor 421 to convert the lower temperature vapor 428 to the mid-temperature vapor 424. A low temperature vapor 428 from another source, such as from the exhaust stage of a multi-effect evaporation desalination stage, enters absorber 414. The concentrated working solution (e.g., LiBr) 438 from the generator 411 is sprayed onto the heat exchange tube 464 surfaces via spray head 166, absorbs the vapor 428 while transferring the chemical absorption heat into the water inside tube 464 via a falling film heat exchange process. The thermal energy generated during this absorption process heats up the circulation water 435 inside the tube 464 to become vaporized. This process produces vapor 436 that reaches mid-temperature range. Meanwhile, the diluted working solution (e.g., LiBr) 434 at the bottom of the absorber 414 is pumped to generator 411 via a circulation pump 433 through a heat exchangers 415 to the spray head 454 in the generator 411. The higher temperature vapor 421 passes through the heat exchanger 451, 452 and 453, vaporizing sprayed diluted working solution (e.g., LiBr) 434 on the heat exchange tube 452 surfaces via falling film heat exchange process. The vapor 423 produced in the generator 411 has lower temperature than the input vapor 421 temperature. Both mid-temperature 423 and 436 are used to drive a multi-effect evaporation system that desalinates seawater or purifies savage water after certain. The working solution (e.g., LiBr) 438 has been gone through one concentration process, so called single-effect heat pump. The concentrated solution flows into absorber 414 via the spray head 466 to complete the heat pump cycle.

Figure 4B:
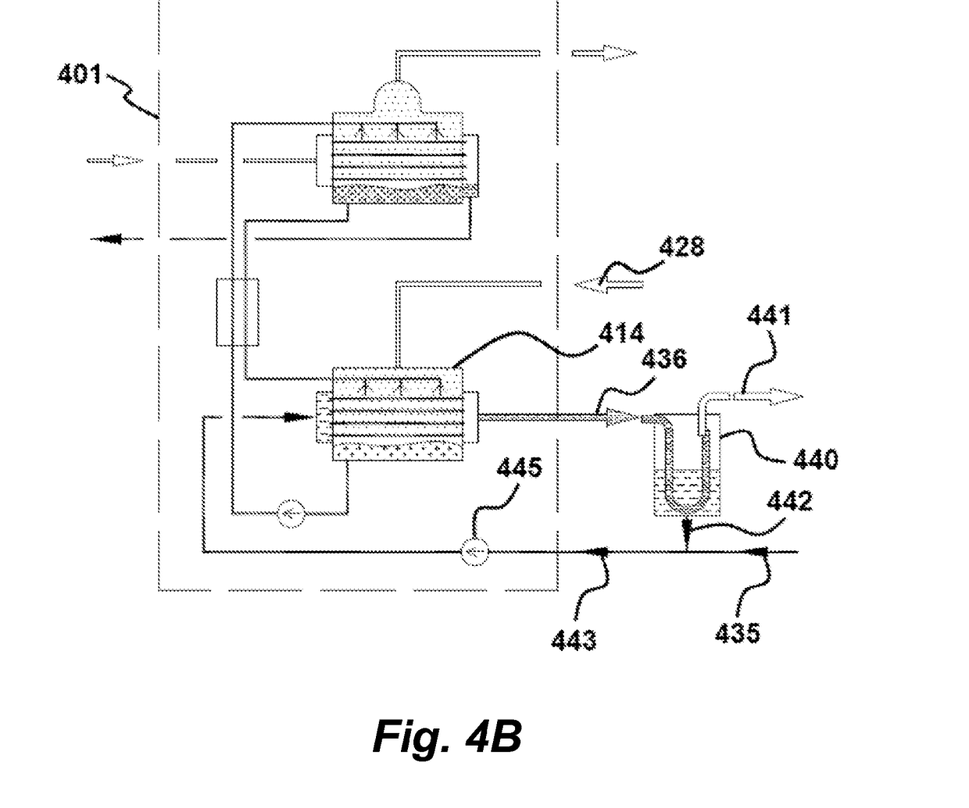
FIG. 4B schematically illustrates an embodiment where the output of the absorber is a two-phase flow and is coupled to a separator to split the vapor and fluid phase (e.g., water and steam). The separated water can be pumped back through the absorber again to obtain more vapor upon heat exchange inside the tubing.

It should be noted that in the absorber 414 the temperature difference between the surface temperature of the tubing 464 and the vapor generated inside tubing 464 may not achieve the ideal pool boiling conditions. Normally a 25° higher temperature is desired to provide "pool boiling" conditions. Therefore, the water inside tubing 464 may only partially evaporate. As illustrated in FIG. 4B, the output 436 through the port is a two-phase flow, e.g., a mixture of steam and water. In this case, a vapor-water separator 440 can be used to separate the vapor and the water. The vapor comes out from port 441 while the water comes out from port 442. A circulation pump 445 is used to drive the water passing through the absorber again to obtain more vapor upon heat exchange inside the tubing 464. The circulation rate depends on the above mentioned temperature difference and is adjustable accordingly. The complement water 435 combines with separated water 442 in the circulation pump 445. It should be noted that this modification for the vapor generation upon absorber is a general method. It can also be used in other absorbers where vapor is produced upon absorption, such as in the absorption heat pump (single-effect or double-effect first type heat pump).

It should also be noted that, in various embodiments, the absorption heat pump (first type heat pump) as illustrated in FIG. 1 and the absorption heat transformer (second type heat pump) as illustrated in FIG. 4 can have identical structures. However, the concentration of their working media, e.g., LiBr solution(s), are typically different both in the generator and in the absorber. The temperatures of the input vapor and output vapor are also typically different between these two types of heat pumps.

In summary, referring to FIG. 3, using a double-effect absorption heat pump (first type heat pump) with a higher temperature vapor and a lower temperature vapor as the input vapors, both the generator and the absorber produce mid-temperature vapor, with the total amount of vapor approximately to be equal to the sum of the higher temperature vapor amount and the lower temperature vapor amount. The function of this first type heat pump is to lift the temperature of the lower temperature vapor to the mid-temperature for further application with the help of higher temperature vapor. In the above-mentioned example, a 163° C. vapor enters the generator and a 40° C. vapor enters the absorber while two parts of 70° C. vapor exit from the generator and the absorber, as summarized in Table 3.

Similarly, using an absorption heat transformer (single-effect, second type heat pump) a mid-temperature vapor is split into two parts. One enters the generator and the other enters the absorber. The higher temperature vapor is produced from the absorber and the lower temperature vapor is produced in the generator. The function of this second type heat pump is to lift the mid-temperature of the input vapor to the higher temperature vapor and the lower temperature vapor for further applications. In one of the applications that are described in detail later, the 100° C. saturated vapor at one atmosphere from a drying system enters both the generator and the absorber, while a 118° C. vapor exit from the absorber and a 70° C. vapor exit from the generator. The 118° C. vapor reenters the drying system via heat exchange to produce 100° C. vapor again in cycle. In this way, a thermal vapor recompression system is formed. The lower temperature vapor can be used for other applications, such as a low temperature multi-effect evaporation apparatus.

Referring to FIG. 1, in a different application, using a single-effect absorption heat pump (still a first type heat pump) with a 163° C. saturated vapor enters the generator while a 100 vapor enters the absorber, both the generator and the absorber produce a 120° C. vapor, as summarized in Table 4.

TABLE 4

Illustrative, but non-limiting, working parameters for a single-effect absorption (second type) heat transformer

| port | medium | temperature (° C.) | flow rate (t/h) |
| --- | --- | --- | --- |
| 421 | vapor | 100 | 1.00 |
| 422 | water | 100 | 1.00 |
| 423 | vapor | 70 | 1.12 |
| 428 | vapor | 100 | 1.12 |
| 436 | vapor | 120 | 1.00 |
| 435 | water | 95 | 1.00 |

Figure 5:
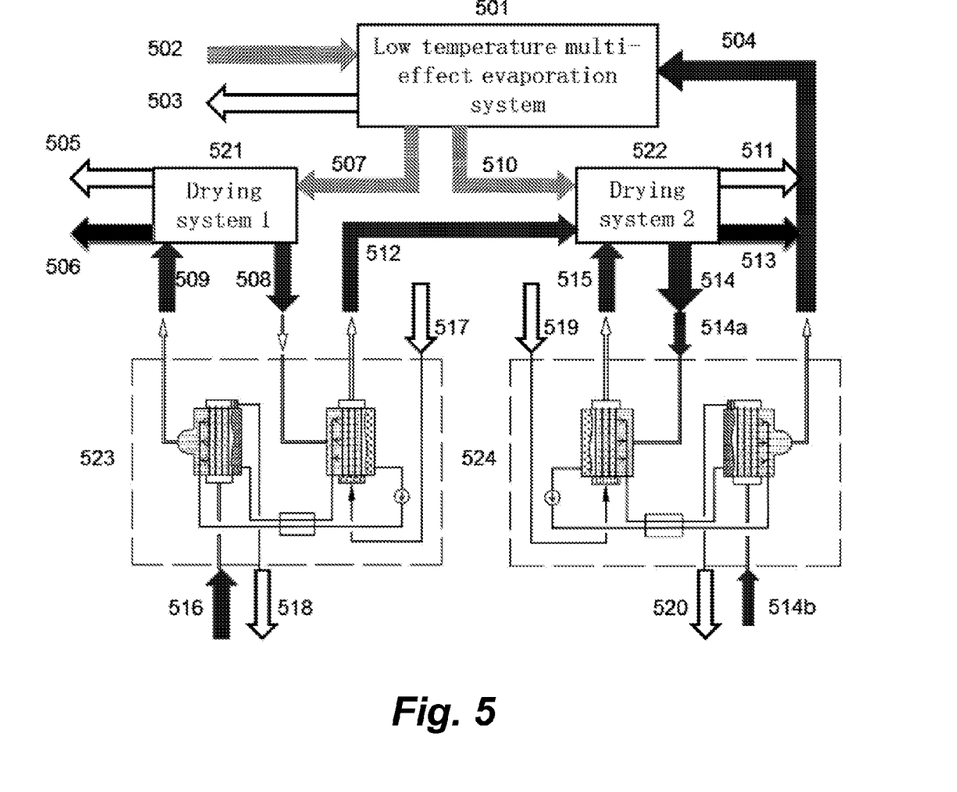
FIG. 5 shows a block diagram of an illustrative system comprising a single-effect absorption heat pump and a single-effect absorption heat transformer, combined with two sewage drying systems and a multi-effect evaporation system, consistent with certain aspects related to the innovations described herein.

FIG. 5 illustrates a combination of an absorption heat pump 523 (single-effect first type heat pump, refer to FIG. 1) and an absorption heat transformer 524 (single-effect second type heat pump, refer to FIG. 4), combining with two sewage drying devices 521 and 522, and a low temperature multi-effect evaporation system 501 (refer to FIG. 3, device F40) that purifies the sewage water. To process a certain amount of brine sewage water with this apparatus, 163° C. vapor 516 provided by a heat source enters a single-effect absorption heat pump 523 (port 121 in FIG. 1), combining with 100° C. vapor 508 (port 128 in FIG. 1) that comes from a sewage drying device 521 to produce vapor 509 at 118° C. (port 123 in FIG. 1). Vapor 509 is used to evaporate the concentrated sewage solution 507 that comes from 501 to produce 100° C. vapor with a heat exchanger in sewage drying device 521. The drying device 521 convert the higher concentration brine 507 that comes from the multi-effect evaporation system 501 into dry salt 506 and fresh water 505. Meanwhile, the temperature lifted vapor 512 (port 136 in FIG. 1) at 118° C. from the heat pump 523 is used to generate 100° C. vapor 514 in the second sewage-drying device 522. The absorption heat transformer 524 using 100° C. vapor 514a (port 421 in FIG. 4) and 514b (port 428 in FIG. 4) that comes from 522 to produce temperature lifted vapor 515 (port 423 in FIG. 4) at 120° C., which is used to dry concentrated brine 510 that from the 501 apparatus via another heat exchange device while producing 100° C. vapor 514 from the drying device 522. At the same time, the absorption heat transformer 524 also produce 70° C. vapor 504 (port 423 in FIG. 4) that is further utilized in the low temperature multi-effect evaporation system 501. Thus, with the help of input higher temperature vapor 516 (port 121 in FIG. 1) the entire combined apparatus acts as a thermal vapor recompression device that can utilize 100° C. vapor 508 produced in the drying device 521 to generate 118° C. vapor 509 and 512 (ports 123 and 136 in FIG. 1); and lift the 100° C. vapor 514 vapor from 522 to produce 120° C. vapor 515. The circulation of 118° C. or 120° C. vapor re-enter the drying device to continue generate more 100° C. vapor, eventually dries up the sewage solution into complete solids 517 (port 135 in FIG. 1) and 519 (port 435 in FIG. 4) are the input water for the absorber 114 or 414, where the water will be evaporated as 118° C. and 120° C. vapor that recirculates into sewage drying devices.

In various embodiments the thermal recompression unit with a sewage drying apparatus, as described above (e.g., as illustrated in FIG. 5), can be described in detail as follows. To process 164 ton/hour 6.1% concentrated sewage solution, 18 ton/hour of 163° C. vapor is consumed. This high temperature vapor enters the absorption heat pump 523 from 516, combines with 15.4 ton/hour 100° C. temperature vapor 508 that produced in the drying device 521 to produce 16.5 ton/hour of 118° C. vapor while drying 19.25 ton/hour 20% brine solution, which is the concentrated solution that produced in the low temperature multi-effect evaporation system that processes the 164 ton/hour 6.1% sewage solution. The absorption heat pump 523 produces another portion of 118° C. vapor 512 with the flow rate of 14.9 ton/hour that enters the second sewage drying unit 522 to dry the second part of 20% brine solution at flow rate of 30.75 ton/hour. The second drying device combines with an absorption heat transformer 524 that utilizes 24.6 ton/hour 100° C. vapor that is generated in the drying device 522 to produce 11.6 ton/hour 120° C. vapor and 13 ton/hour 70° C. vapor that is used in the low temperature multi-effect evaporation system 501 to process the less concentrated brine. The second drying device produces 26.5 ton/hour fresh water and 6.15 ton/hour dry salt. In this way, all the sewage water is evaporated so that zero amount sewage will be released into the environment. The total effect of the combined system is to use 18 ton/hour of 163° C. vapor plus 16 ton/hour cooling water to process 164 ton/hour of 6.1% sewage water to obtain 170 ton/hour fresh water and 10 ton/hour dry salt with zero sewage solution releasing into the environment.

Table 5 illustrates the working parameters for such a system.

TABLE 5

Illustrative, but non-limiting working parameters for a thermal vapor recompression system along with two drying devices and a low temperature evaporation system.

| port | medium | temperature (° C.) | flow rate (t/h) |
| --- | --- | --- | --- |
| 502 | brine 6.1% | 30 | 164.00 |
| 503 | water | n/a | 127 |
| 504 | vapor | 70 | 13 |
| 505 | water | 118 | 16.5 |
| 506 | salt | n/a | 3.85 |
| 507 | brine 20% | 67 | 19.25 |
| 508 | vapor | 100 | 15.40 |
| 509 | vapor | 118 | 16.5 |

TABLE 5-continued

Illustrative, but non-limiting working parameters for a thermal vapor recompression system along with two drying devices and a low temperature evaporation system.

| port | medium | temperature (° C.) | flow rate (t/h) |
|------|--------|--------------------|-----------------|
| 510 | brine 20% | 67 | 30.75 |
| 511 | water | 120 | 26.5 |
| 512 | vapor | 118 | 14.9 |
| 513 | salt | n/a | 6.15 |
| 514 | vapor | 100 | 24.6 |
| 515 | vapor | 120 | 11.6 |
| 516 | vapor | 163 | 18 |
| 517 | water | 95 | 16 |
| 518 | water | 163 | 18 |
| 519 | water | 95 | 11.6 |
| 520 | water | 100 | 11.6 |

It should be noted that to completely process and dry each ton of 6.1% brine solution, one-ninth ton of 163° C. vapor is consumed. Because the thermal energy that is needed to completely dry 1 ton of water is about 750 kWh, the equivalent thermal energy that is consumed with above proposed method is 82 kWh. This value can be convert into equivalent of electricity consumption with a 38% thermal to electric conversion efficiency, which equals to 31.3 kWh. This value is comparable with a typical mechanical vapor recompression system of 30 kWh for each ton of sewage to be dried. Considering that the temperature of the thermal energy consumed is only 163° C. while electricity generation normally requires 400° C. to 500° C. vapor. Therefore, this invention has its advantages against the MVR solution in terms utilizing lower grade of thermal energy.

It should be recognized that while many of the systems are described above with respect to lithium bromide (LiBr) systems, they can also be fabricated to work with other absorption chiller systems (e.g., ammonia/hydrogen/water).

It will also be recognized that where lithium bromide is described above as a working medium, other working media are contemplated. In certain embodiments lithium bromide can be combined with other materials to improve viscosity/mixing, mass transport, decrease corrosivity, or modify other properties. For example, in certain embodiments, the lithium bromide is combined with an organic salt (e.g., an organic salt of sodium and/or potassium such as an acetate, a formate, a lactate, and the like). Illustrative corrosion inhibitors include, but are not limited to lithium nitrate, lithium chromate, lithium arsenite, and lithium molybdate. Illustrative surfactants include, but are not limited to 2-ethyl-1-hexanol, 1-octanol, and the like.

It should be noted that if there is no need to reuse the low temperature vapor, the LiBr absorbers in the embodiments described above can still use the regular cooling water to dissipate the latent heat. In these cases the absorbers would be similar to what has been used as in a prior art.

It will be noted that the various media, dimensions, working temperatures and the like are intended to be illustrative and non-limiting. Using the teachings provided herein numerous variations of the devices and uses thereof will be available to one of skill in the art and will reflect the particular sources of high and low temperature vapor, desired applications, and the like.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. An all vapor driven absorption heat pump, said heat pump comprising:
a first heat pump generator configured to receive a high temperature vapor from a high temperature heat source, wherein said first generator comprises a falling film heat exchanger and said first generator is configured to receive a dilute working medium from a heat pump absorber and utilize said heat from said high temperature vapor to evaporate heat transport material from said dilute working medium delivered through said falling film heat exchanger and thereby provide a mid-temperature vapor output and a concentrated working medium;
optionally, a second heat pump generator comprising a second falling film heat exchanger, wherein said second heat pump generator is configured to receive said concentrated working medium produced in said first heat pump generator and said output vapor produced in said first heat pump generator and to utilize heat from output vapor produced in said first heat pump to further evaporate concentrated working medium produced in said first heat pump generator and delivered through said second falling film heat exchanger and thereby provide a mid-temperature vapor output and a more concentrated working medium; and
a heat pump absorber comprising a third falling film heat exchanger, where said absorber is configured to receive a heat transport material in a low temperature vapor form from a low temperature source and is configured to receive said concentrated working medium from said first heat pump generator when said second heat pump generator is absent and to receive said concentrated working medium from said second heat pump generator when said second heat pump generator is present, and is configured to utilize heat produced by absorption of said low temperature vapor in said concentrated working medium to produce a mid-temperature vapor output and said dilute working medium, and wherein said heat pump absorber is configured to deliver said dilute working medium to said first heat pump generator.

2. The heat pump of claim 1, wherein said second heat pump generator is absent and said transformer comprises a single effect heat pump.

3. The heat pump of claim 1, further comprising a heat exchanger that exchanges heat between a line that delivers said concentrated working medium from said first heat pump generator to said heat pump absorber and a line that delivers said dilute working medium from said heat pump absorber to said first heat pump generator.

4. The heat pump of claim 1, wherein said second heat pump generator is present and said heat pump comprises a dual effect heat pump.

5. The heat pump of claim 4, wherein said first heat pump generator is a high pressure generator and said second heat pump generator is a lower pressure heat pump generator.

6. The heat pump of claim 1, further comprising a heat exchanger that exchanges heat between a line that delivers said concentrated working medium from said second heat pump generator to said heat pump absorber and a line that delivers said dilute working medium from said heat pump absorber to said first heat pump generator.

7. The heat pump of claim 1, further comprising a heat exchanger that exchanges heat between a line that delivers said concentrated working medium from said first heat pump generator to said second heat pump generator and a line that delivers said dilute working medium from said heat pump absorber to said first heat pump generator.

8. The heat pump of claim 1, further comprising a heat exchanger that exchanges heat between a line that delivers a heat transport fluid out of said first heat pump generator.

9. The heat pump of claim 1, wherein said vapor comprises water vapor.

10. The heat pump of claim 1, wherein the low temperature vapor is at a temperature that ranges from about 40° C. to about 70° C.

11. The heat pump of claim 1, wherein the mid-temperature vapor is at a temperature that ranges from about 60° C. to about 130° C.

12. The heat pump of claim 1, wherein the high temperature vapor is at a temperature that ranges from about 130° C. to about 170° C.

13. The heat pump of claim 1, wherein the heat exchanger in said absorber is configured to receive a fluid and absorb vapor thereby converting latent heat of the absorbed vapor into chemical absorption heat to generate vapor inside the heat exchanger while producing said dilute working medium.

14. The heat pump of claim 1, wherein the output of said absorber is a two-phase vapor/liquid mixture and said output is coupled to a vapor/liquid separator.

15. The heat pump of claim 14, wherein said separator channels said liquid phase back into the absorber.

16. The heat pump of claim 1, wherein said heat transport fluid is water.

17. The heat pump of claim 1, wherein said working medium comprises lithium bromide.

18. The heat pump of claim 17, wherein said working medium comprises lithium bromide and an organic salt of sodium and/or potassium.

19. The heat pump of claim 18, wherein said organic salt is a salt selected from the group consisting of an acetate, a formate, and a lactate.

20. The heat pump of claim 1, wherein said working medium comprises ammonia.

21. The heat pump of claim 1, wherein said high temperature heat source is selected from the group consisting of a solar concentrator, a steam turbine, a nuclear power plant, a coal power plant, and a waste incineration facility.

22. The heat pump of claim 1, wherein said heat pump is operably coupled to an evaporation desalination apparatus so that the mid-temperature vapor output of the heat pump enters said desalination apparatus and low temperature vapor output from said desalination apparatus enters said heat pump.

23. The heat pump of claim 22, wherein said desalination apparatus is a multiple-effect evaporation desalination apparatus.

24. The heat pump of claim 22, wherein low temperature vapor from said desalination apparatus enters either conventional condenser or a low temperature phase changing thermal storage device to condense into water.

25. The heat pump of claim 22, wherein said water is returned to said absorber.

26. The heat pump of claim 1, wherein said heat pump is operably coupled to a drying system to produce a thermal recompression system.

27. A method of combining a high temperature vapor and a low temperature vapor to produce a mid-temperature vapor, said method comprising:
providing a heat pump according to claim 1;
introducing said high temperature vapor into said first heat pump generator in said heat pump;
introducing said low temperature vapor into an absorber comprising said heat pump; and
receiving a mid-temperature vapor produced by said heat pump.

28. The method of claim 27, wherein said heat pump is operably coupled to an evaporation and/or desalination apparatus so that the mid-temperature vapor output of the heat pump enters said desalination apparatus and low temperature vapor output from said desalination apparatus enters said heat pump.

* * * * *